(12) United States Patent
Cazares et al.

(10) Patent No.: US 11,719,318 B1
(45) Date of Patent: Aug. 8, 2023

(54) STATOR ASSEMBLY

(71) Applicant: Schaeffler Technologies AG & Co. KG, Herzogenaurach (DE)

(72) Inventors: Juan Pablo Cazares, Puebla (MX); Alfredo Perez Mitre Jimenez, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/974,819

(22) Filed: Oct. 27, 2022

(51) Int. Cl.
| | |
|---|---|
| *F16H 41/24* | (2006.01) |
| *F16H 45/02* | (2006.01) |
| *F16H 41/28* | (2006.01) |
| *F16D 33/20* | (2006.01) |
| *F16H 41/26* | (2006.01) |
| *F16D 33/18* | (2006.01) |

(52) U.S. Cl.
CPC ............ *F16H 41/26* (2013.01); *F16D 33/18* (2013.01); *F16D 33/20* (2013.01); *F16H 41/28* (2013.01); *F16H 2041/246* (2013.01); *F16H 2045/0273* (2013.01)

(58) Field of Classification Search
CPC ............ F16H 41/26; F16H 2041/246; F16H 2045/0273; F16H 41/28; F16D 33/20; F16D 33/18
See application file for complete search history.

(56) References Cited

U.S. PATENT DOCUMENTS

| 8,251,193 | B2* | 8/2012 | Kombowski | F16H 45/02 192/3.29 |
|---|---|---|---|---|
| 10,309,508 | B2* | 6/2019 | Matsuda | F16H 41/24 |
| 10,927,935 | B2* | 2/2021 | Mcconnell | F16D 41/066 |
| 2017/0292592 | A1* | 10/2017 | Hague | F16C 17/045 |
| 2019/0383375 | A1* | 12/2019 | Krause | F16H 41/28 |
| 2020/0263774 | A1* | 8/2020 | Angel | F16H 41/28 |

* cited by examiner

*Primary Examiner* — Tinh Dang

(57) ABSTRACT

A stator assembly for a torque converter includes a body and a washer. The body is rotatable about an axis and has a cavity defined by an axial wall radially spaced from the axis and a radial wall extending radially inward from the axial wall. The washer is disposed in the cavity and is configured to be compressed against the radial wall. The washer includes a base and a plurality of circumferentially spaced from each other and extending radially outward from the base. The plurality of tabs are configured to non-rotatably connect to the axial wall.

20 Claims, 8 Drawing Sheets

STATOR ASSEMBLY

TECHNICAL FIELD

The present disclosure relates generally to a stator assembly for a torque converter, and more specifically to a stator assembly including a thrust washer non-rotatably connected to a stator body and a torque converter including the stator assembly.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, a torque converter may include a stator assembly disposed axially between the turbine assembly and the impeller assembly that redirects fluid flowing from the turbine assembly before the fluid reaches the impeller assembly. During operation of the torque converter, drag forces act on the stator assembly, which can cause relative rotation between components of the stator assembly, and undesirable wear of stator assembly components.

SUMMARY

Embodiments of the present disclosure provide a stator assembly for a torque converter. The stator assembly includes a body and a washer. The body is rotatable about an axis and has a cavity defined by an axial wall radially spaced from the axis and a radial wall extending radially inward from the axial wall. The washer is disposed in the cavity and is configured to be compressed against the radial wall. The washer includes a base and a plurality of tabs circumferentially spaced from each other and extending radially outward from the base. The plurality of tabs are configured to non-rotatably connect to the axial wall.

In embodiments, in an uncompressed state, the plurality of tabs may extend obliquely relative to the axis. In a compressed state, the plurality of tabs may extend orthogonally relative to the axis. In embodiments, in the uncompressed state, the plurality of tabs may be radially inside of the axial wall. In the compressed state, the plurality of tabs may engage the axial wall. Each tab may include an end spaced from the base. In the compressed state, the ends may be radially outside of the axial wall. The plurality of tabs may be configured to deform the axial wall during compression from the uncompressed state to the compressed state.

In embodiments, the plurality of tabs may include a plurality of first tabs extending, in the uncompressed state, in a first axial direction away from the base in the uncompressed state, and a plurality of second tabs extending, in the uncompressed state, in a second, opposite axial direction away from the base. The plurality of first tabs and the plurality of second tabs may be arranged in an alternating manner about the axis.

In embodiments, at least some of the tabs may include a plurality of teeth configured to deform the axial wall during compression from the uncompressed state to the compressed state. In embodiments, the plurality of tabs may be configured to expand outwardly when the washer is compressed against the radial wall.

Embodiments of the present disclosure further provide a torque converter including a front cover, an impeller, a turbine, and a stator assembly. The front cover is arranged to receive a torque. The impeller has an impeller shell non-rotatably connected to the cover. The turbine is in fluid communication with the impeller and includes a turbine shell. The stator assembly is disposed axially between the impeller shell and the turbine shell. The stator assembly includes a body and a washer. The body is rotatable about an axis and has a cavity defined by an axial wall radially spaced from the axis and a radial wall extending radially inward from the axial wall. The washer is disposed in the cavity and is configured to be compressed against the radial wall. The washer includes a base and a plurality of tabs circumferentially spaced from each other and extending radially outward from the base. The plurality of tabs are configured to non-rotatably connect to the axial wall.

In embodiments, the plurality of tabs may be configured to expand radially outwardly when the washer is compressed against the radial wall. In embodiments, in an uncompressed state, the plurality of tabs may extend obliquely relative to the axis. In embodiments, at least some of the tabs include a plurality of teeth configured to deform the axial wall. In embodiments, each tab includes an end spaced from the base. In an uncompressed state, the plurality of tabs may be radially inside of the axial wall. In a compressed state, the ends may be radially outside of the axial wall.

Embodiments disclosed herein provide the advantageous benefit of non-rotatably connecting a thrust washer to a stator body, which prevents relative rotation between the thrust washer and the stator body during operation of a torque converter, thereby reducing wear on the stator body. Furthermore, embodiments disclosed herein offer design advantages by non-rotatably connecting the thrust washer to the stator body without additional fasteners and/or costly drilling operations.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
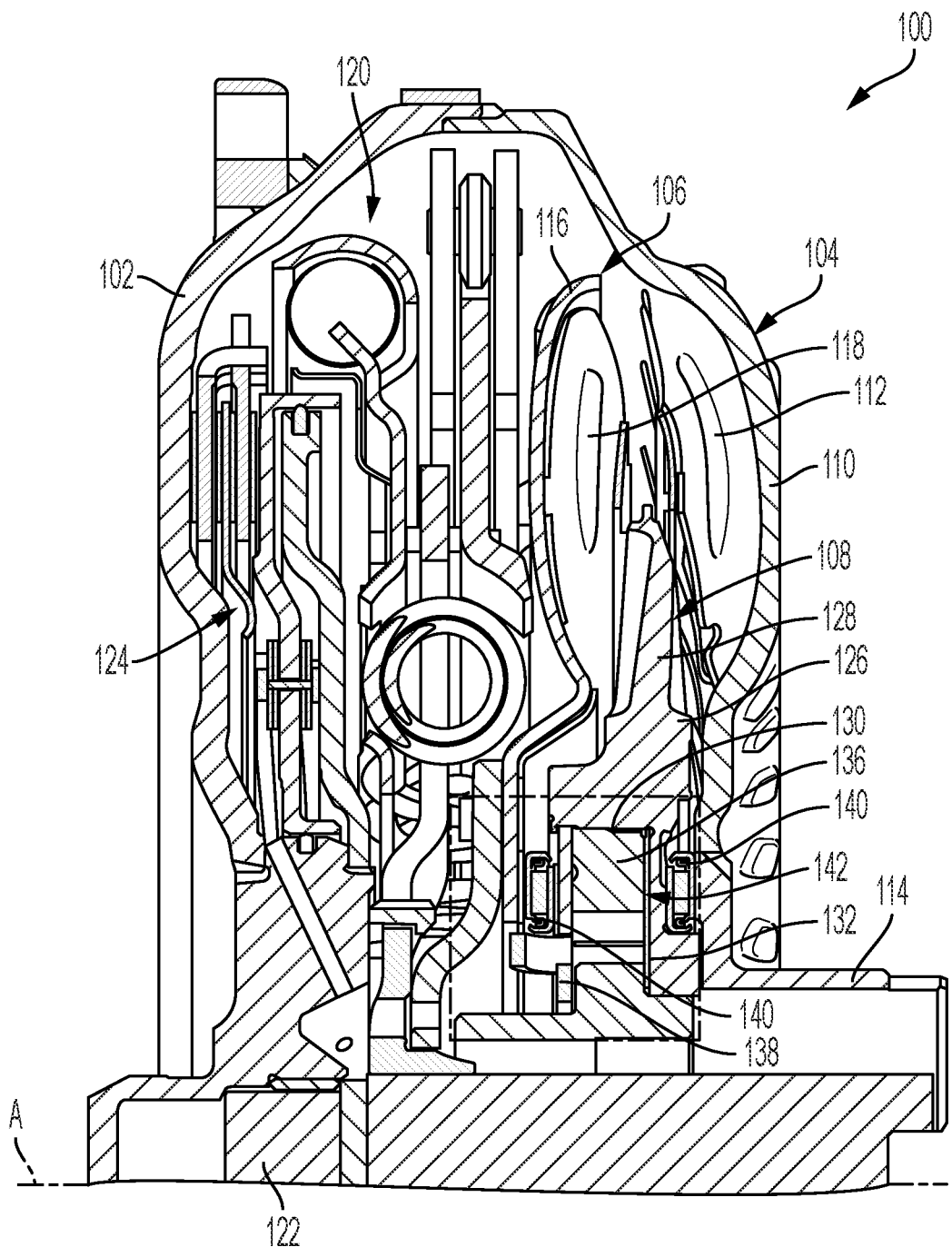
FIG. 1 illustrates a cross-sectional view of a torque converter having a stator assembly according to an embodiment of the present disclosure.
Figure 2A:
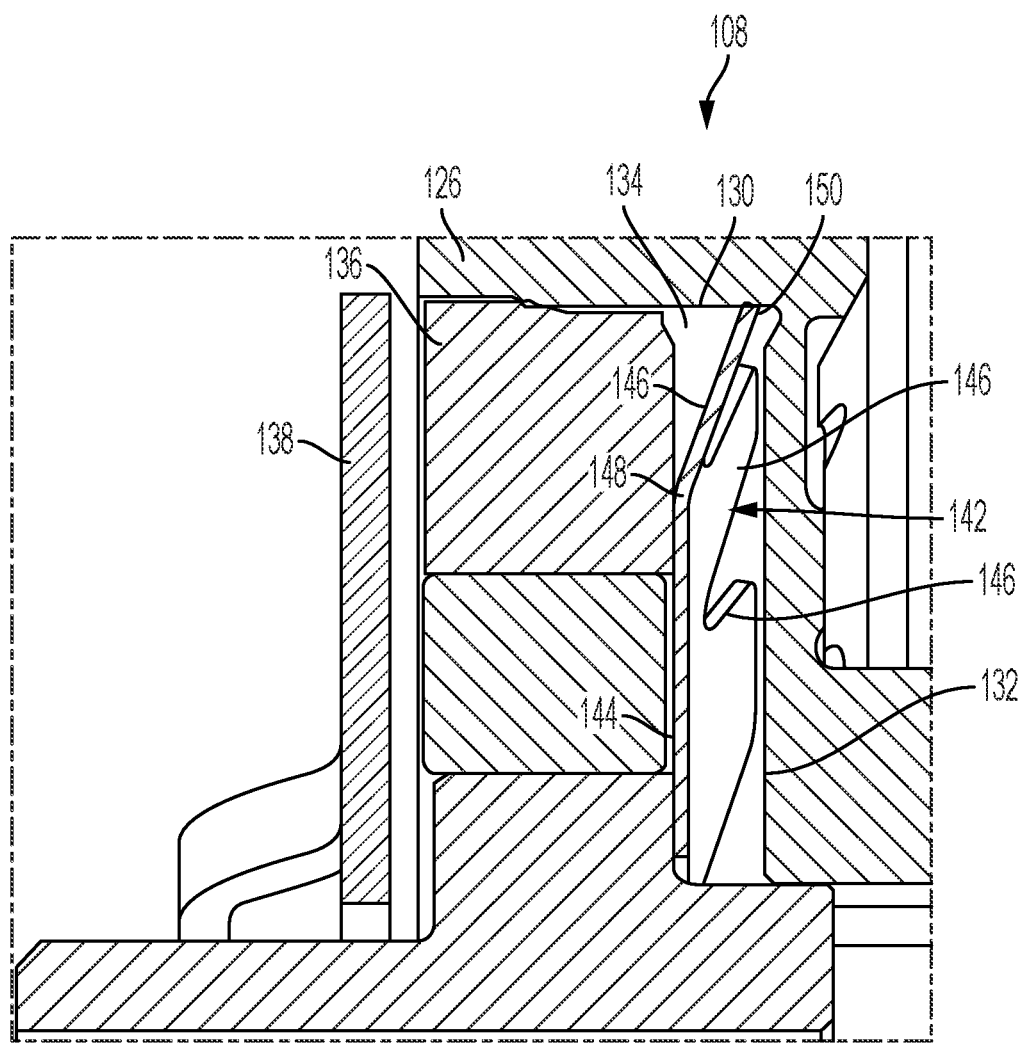
FIG. 2A illustrates an enlarged view of an area of the torque converter shown in FIG. 1 showing one embodiment of a thrust washer of the stator assembly in an uncompressed state.
Figure 2B:
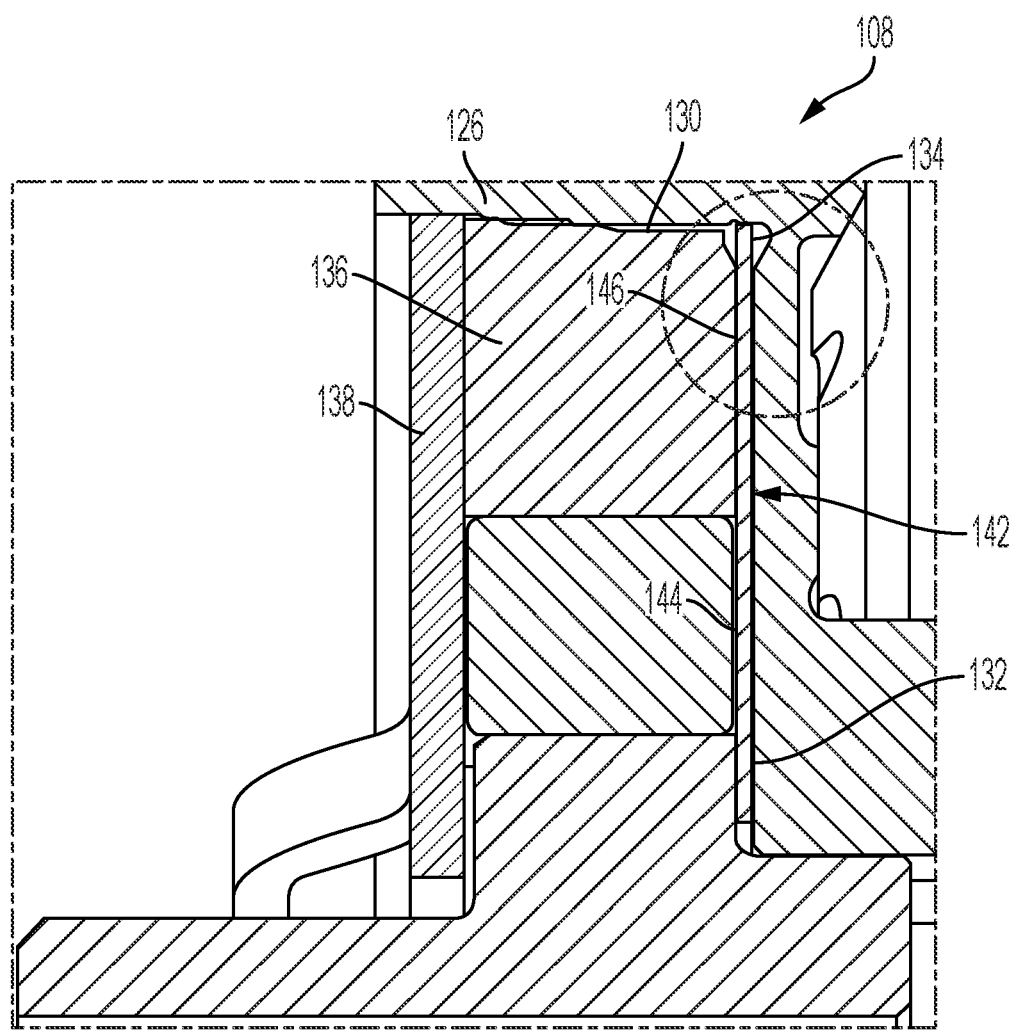
FIG. 2B illustrates the embodiment of the thrust washer shown in FIG. 2A in a compressed state.
Figure 2C:
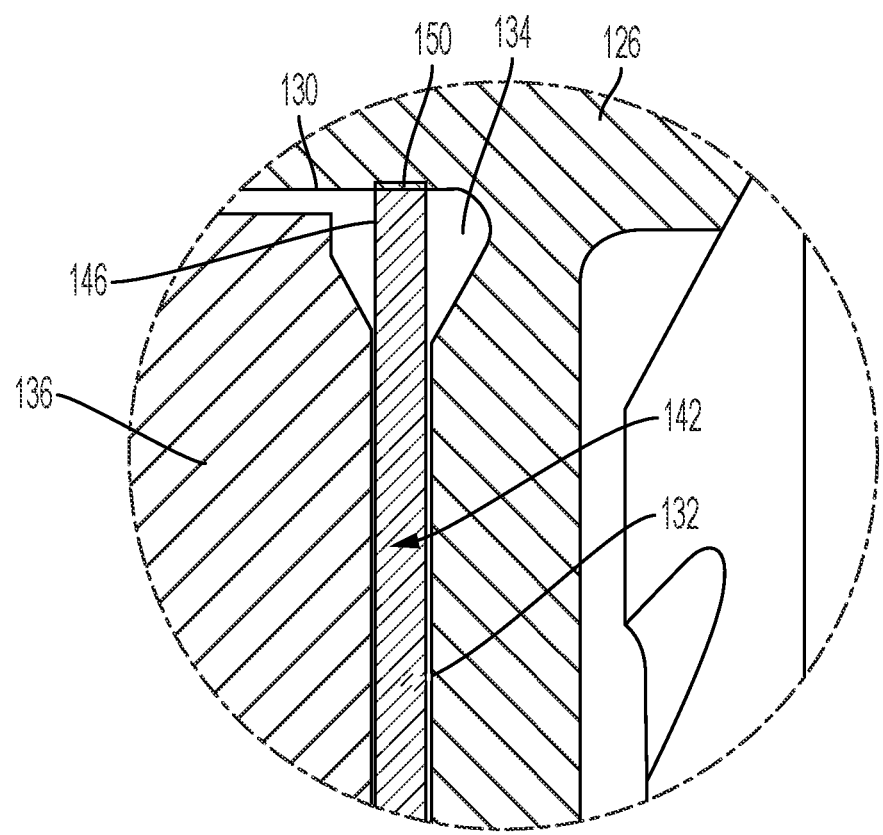
FIG. 2C illustrates an enlarged view of an area of the torque converter shown in FIG. 2A.

Referring to FIGS. 1-2C, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; and a stator assembly 108. The impeller assembly 104 includes: an impeller shell 110 non-rotatably connected to the front cover 102; at least one impeller blade 112 attached to an inner surface of the impeller shell 110; and an impeller hub 114 fixed to a radially inner end of the impeller shell 110. The turbine assembly 106 includes: a turbine shell 116; and at least one turbine blade 118 attached to the turbine shell 116. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

In an example embodiment, the torque converter 100 includes a damper assembly 120. The damper assembly 120 is positioned axially between the front cover 102 and the turbine assembly 106 and is configured for transferring torque from the front cover 102 to a transmission input shaft 122.

In an example embodiment, the torque converter 100 includes a lock-up clutch 124. The lock-up clutch 124 is configured to selectively transfer torque from the front cover 102 to the transmission input shaft 122.

The stator assembly 108 is disposed axially between the turbine assembly 106 and the impeller assembly 104 to redirect fluid flowing from the turbine blade 118 before the fluid reaches the impeller assembly 104 to increase the efficiency of torque converter 100. For example, the impeller blade 112, when rotated about the central axis A, pushes fluid outwardly. The fluid pushes against the turbine assembly 106, causing the turbine assembly 106 to revolve about the central axis A. The stator assembly 108 functions to return the fluid from the turbine assembly 106 back to the impeller assembly 104 with minimal or no power loss.

The stator assembly 108 includes a stator body 126 and at least one stator blade 128 attached thereto. The stator body 126 includes an axial wall 130 radially spaced from the central axis A and a radial wall 132 extending radially inward from the axial wall 130. The axial wall 130 extends along the central axis A. The axial wall 130 and the radial wall 132 define a cavity 134.

The stator assembly 108 further includes a one-way clutch 136 engaged with the stator body 126 and disposed in the cavity 134. For example, the one-way clutch 136 may include an outer race (not numbered) connected to the axial wall 130, and inner race (not numbered) connected to an inner diameter of the radial wall 132, and rollers (not numbered) arranged between the inner race and the outer race.

The stator assembly 108 further includes a side plate 138 in contact with the one-way clutch 136. The side plate 138 is provided axially between the stator assembly 108 and the turbine assembly 106 and is configured to retain or hold the one-way clutch 136 within the cavity 134. An axial thrust bearing 140 may further be provided axially between a radially extending inner portion of the turbine shell 116 and the side plate 138 and/or axially between the stator body 126 and the impeller assembly 104.

The stator assembly 108 further includes an axial thrust washer 142 disposed axially between the one-way clutch 136 and the radial wall 132. The axial thrust washer 142 includes a base 144 and a plurality of tabs 146 extending from the base 144. The plurality of tabs 146 are arranged on an outer diameter of the base 144 and extend radially outward from the outer diameter of the base 144. The plurality of tabs 146 are circumferentially spaced from each other about the central axis A.

The plurality of tabs 146 include a first end 148 pivotally connected to the base 144 and a second end 150 spaced from the first end 148. The plurality of tabs 146 may be integrally formed with the base 144. For example, the base 144 and the plurality of tabs 146 may be formed by stamping. The plurality of tabs 146 may be designed as bendable tabs. That is, after forming the plurality of tabs 146, the plurality of tabs 146 may be bent, e.g., via an overbend process, relative to the base 144.

The axial thrust washer 142 is configured to be compressed against the radial wall 132. For example, the axial thrust washer 142 may be compressible between an uncompressed state, as shown in FIG. 2A, and a compressed state, as shown in FIG. 2B, by the one-way clutch 136. In such an example, during assembly of the stator assembly 108, the axial thrust washer 142 may be inserted into the cavity 134 prior to the one-way clutch 136. In this situation, the axial thrust washer 142 is in the uncompressed state. In the uncompressed state, the second ends 150 of the plurality of tabs 146 are arranged radially inside of the axial wall 130. Arranging the seconds ends 150 radially inside of the axial wall 130 facilitates assembly of the axial thrust washer 142 into the cavity 134. That is, in an uncompressed state, the axial thrust washer 142 is moveable relative to the stator body 126. The base 144 may be axially spaced from the radial wall 132 in the uncompressed state.

During assembly of the one-way clutch 136 into the cavity 134, the one-way clutch 136 engages the axial thrust washer 142 and compresses the axial thrust washer 142 against the radial wall 132. During compression of the axial thrust washer 142, the tabs 146 bend about the first end 148 towards the base 144 and engage the axial wall 130. In this situation, the tabs 146 expand radially outwardly and deform the axial wall 130. In the compressed state, the second ends 150 of the tabs 146 are disposed radially outside of the axial wall 130, as shown in FIG. 2C. The plurality of tabs 146 may extend orthogonally relative to the central axis A in the compressed state. Deforming the axial wall 130 non-rotatably connects the axial thrust washer 142 to the stator body 126. For example, the tabs 146 may create grooves (not numbered) in the axial wall 130, e.g., by directing material from the axial wall 130 between the tabs 146, that circumferentially constrain the tabs 146, which can prevent relative rotation between the axial thrust washer 142 and the stator body 126 thereby reducing wear of the stator body 126.

Figure 3:
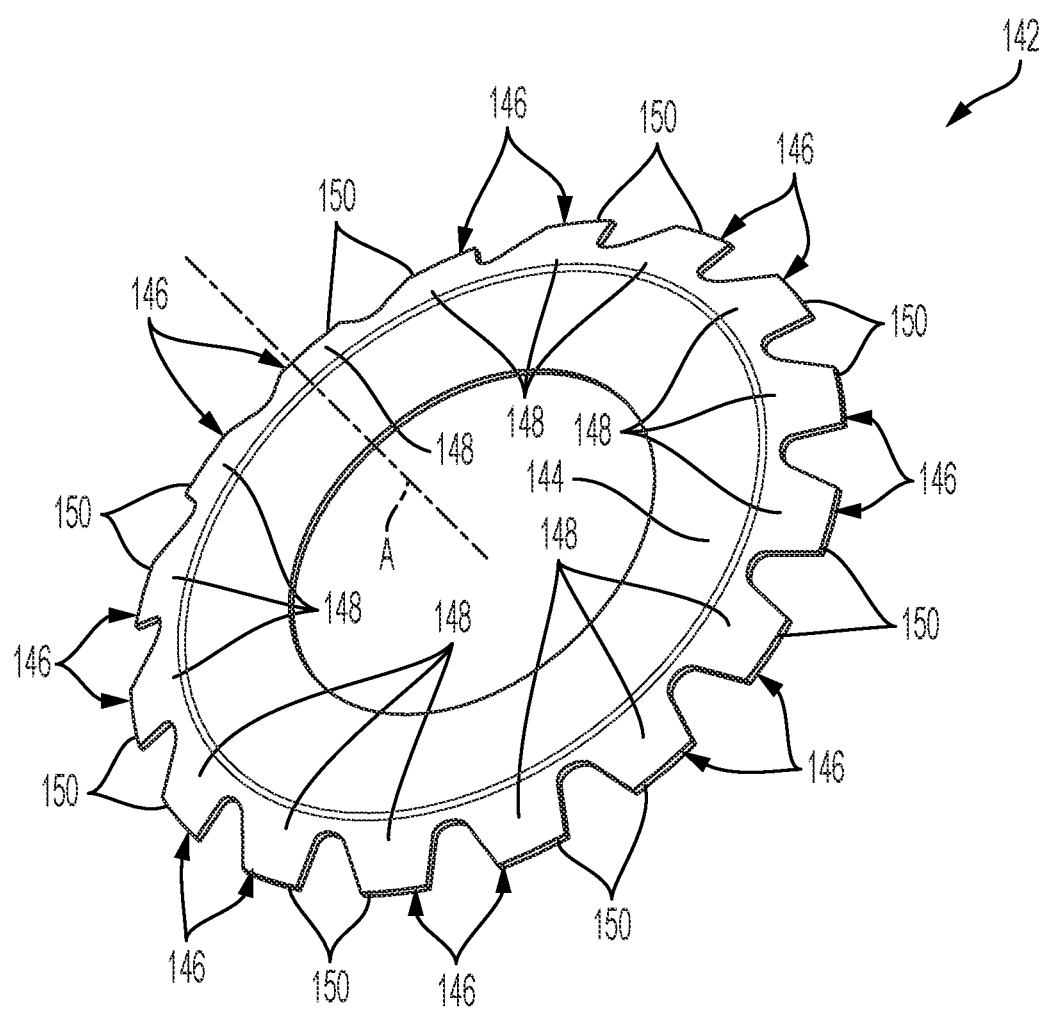
FIG. 3 illustrates a perspective view of the thrust washer shown in FIG. 2A.
Figure 4:
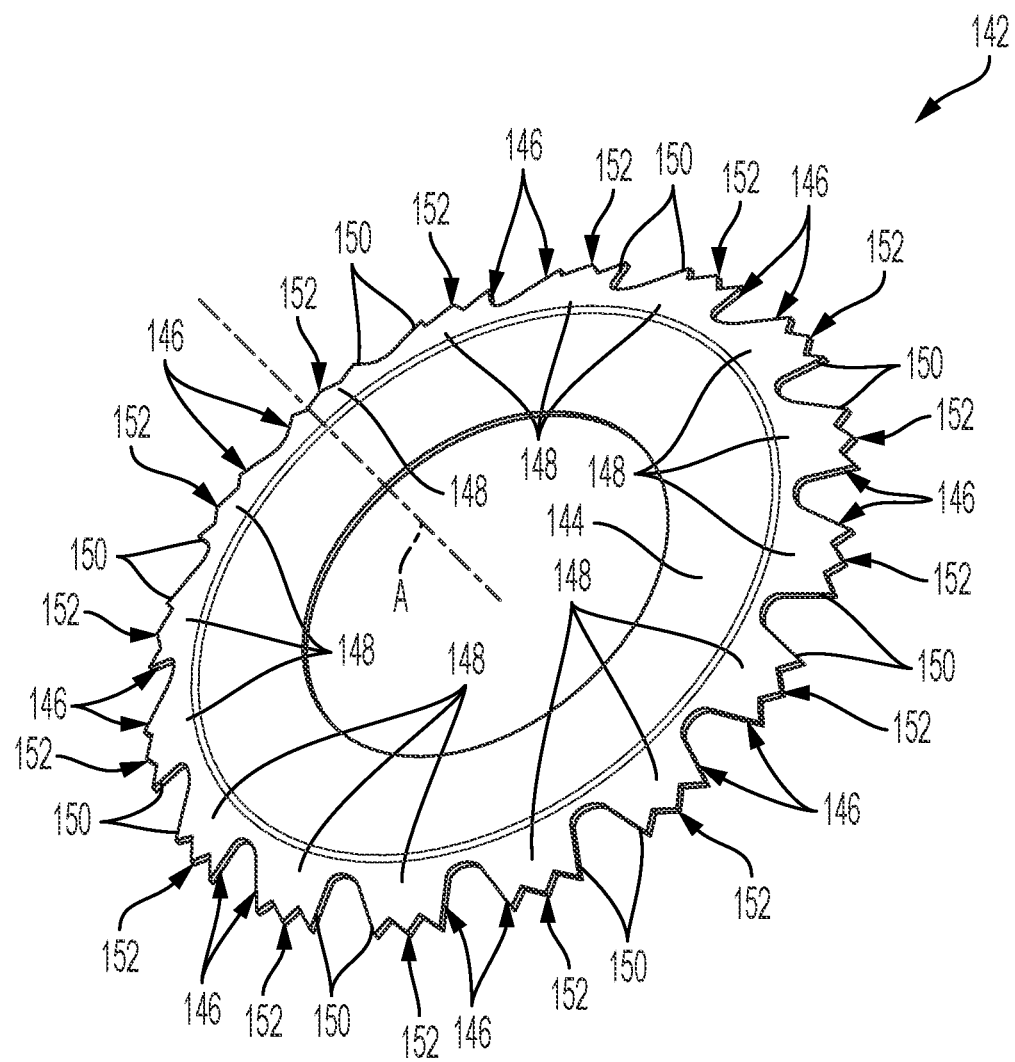
FIG. 4 illustrates a perspective view of another embodiment of the thrust washer of the present disclosure.

In the uncompressed state, the plurality of tabs 146 extend obliquely relative to the central axis A. That is, in the uncompressed state, the plurality of tabs 146 may be bent in a first axial direction AD1 and/or a second, opposite axial direction AD2 relative to the central axis A. As one example, each of the tabs 146 may be bent in the first axial direction AD1, as shown in FIGS. 3 and 4. As another example, each of the tabs 146 may be bent in the second axial direction AD2.

Figure 5:
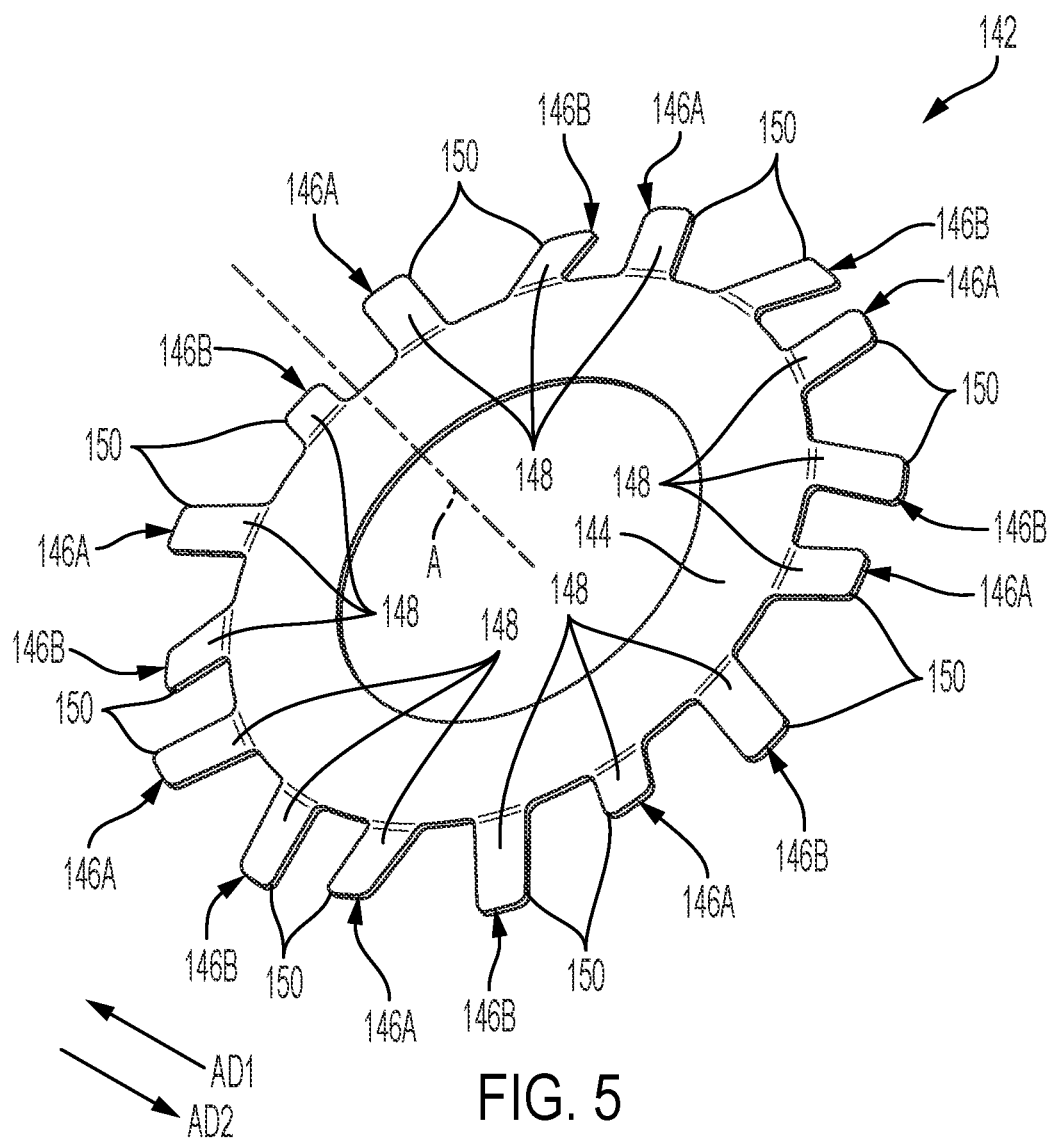
FIG. 5 illustrates a perspective view of another embodiment of the thrust washer of the present disclosure.

As yet another example, the plurality of tabs 146 may include a plurality of first tabs 146A and a plurality of second tabs 146B. The plurality of first tabs 146A may be bent in the first axial direction AD1, and the plurality of second tabs 146B may be bent in the second axial direction AD2, as shown in FIG. 5. In such an example, the plurality of first tabs 146A and the plurality of second tabs 146B may be arranged in an alternating manner about the central axis A. That is, circumferentially adjacent tabs 146 may be bent in opposite axial directions AD1, AD2. In the discussion above and in the discussion that follows, capital letters are used to designate a specific component from a group of components otherwise designated by a three-digit number, for example, tabs 146B is a specific example from among tabs 146.

The axial thrust washer 142 may include any suitable number of tabs 146. The tabs 146 may be uniformly spaced about the central axis A. The plurality of tabs 146 may have any suitable shape, e.g., trapezoidal (see FIGS. 3 and 6), rectangular (see FIGS. 4 and 5), triangular, etc.

Figure 6:
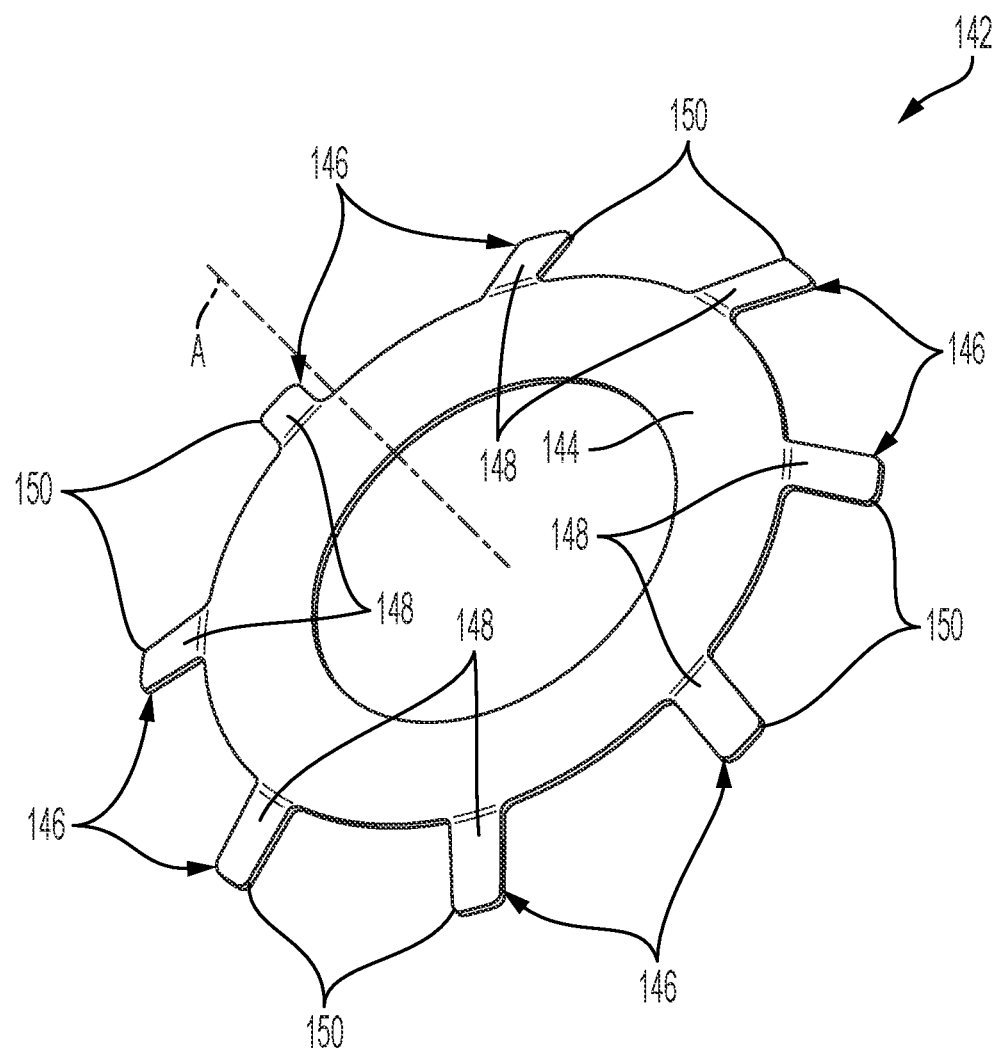
FIG. 6 illustrates a perspective view of another embodiment of the thrust washer of the present disclosure.

At least some of the tabs 146 may include a plurality of teeth 152 arranged at the respective second ends 150, as shown in FIG. 6. The teeth 152 may be configured to engage, and specifically, deform, the axial wall 130 during compression of the axial thrust washer 142. For example, in the uncompressed state, the teeth 152 may be arranged radially inside of the axial wall 130, and, in the compressed state, the teeth 152 may be arranged radially outside of the axial wall 130. During compression of the axial thrust washer 142, the teeth 152 may create grooves in the axial wall 130. In this situation, material from the axial wall 130 is directed between the teeth 152, which can assist in circumferentially constraining the teeth 152 and thereby non-rotatably connecting the axial thrust washer 142 to the axial wall 130.

Embodiments according to the present disclosure provide various advantages including reducing wear on a stator assembly by non-rotatably connecting a thrust washer to a stator body without any additional fasteners or costly drilling operations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

List of Reference Numbers
100 torque converter
102 front cover
104 impeller
106 turbine
108 stator assembly
110 impeller shell
112 impeller blade
114 impeller hub
116 turbine shell
118 turbine blade
120 damper assembly
122 transmission input shaft
124 lock-up clutch
126 stator body
128 stator blade
130 axial wall
132 radial wall
134 cavity
136 one-way clutch
138 side plate
140 axial thrust bearing
142 axial thrust washer
144 base
146 tabs
148 end
150 end
152 teeth
A central axis
AD1 axial direction
AD2 axial direction

What is claimed is:
1. A stator assembly for a torque converter, comprising:
a body rotatable about an axis and having a cavity defined by an axial wall radially spaced from the axis and a radial wall extending radially inward from the axial wall; and
a washer disposed in the cavity and configured to be compressed against the radial wall, the washer including:
a base; and a plurality of tabs circumferentially spaced from each other and extending radially outward from the base, the plurality of tabs being configured to non-rotatably connect to the axial wall.

2. The stator assembly of claim 1, wherein, in an uncompressed state, the plurality of tabs extend obliquely relative to the axis.

3. The stator assembly of claim 2, wherein, in a compressed state, the plurality of tabs extend orthogonally relative to the axis.

4. The stator assembly of claim 2, wherein the plurality of tabs includes a plurality of first tabs extending, in the uncompressed state, in a first axial direction away from the base, and a plurality of second tabs extending, in the uncompressed state, in a second, opposite axial direction away from the base.

5. The stator assembly of claim 4, wherein the plurality of first tabs and the plurality of second tabs are arranged in an alternating manner about the axis.

6. The stator assembly of claim 2, wherein, in the uncompressed state, the plurality of tabs are radially inside of the axial wall.

7. The stator assembly of claim 2, wherein, in a compressed state, the plurality of tabs engage the axial wall.

8. The stator assembly of claim 7, wherein the plurality of tabs are configured to deform the axial wall during compression from the uncompressed state to the compressed state.

9. The stator assembly of claim 7, wherein each of the tabs includes a plurality of teeth configured to deform the axial wall during compression from the uncompressed state to the compressed state.

10. The stator assembly of claim 1, wherein, in an uncompressed state, the plurality of tabs are radially inside of the axial wall.

11. The stator assembly of claim 10, wherein each tab includes an end spaced from the base, and, in a compressed state, the ends are radially outside of the axial wall.

12. The stator assembly of claim 10, wherein the plurality of tabs are configured to deform the axial wall during compression from the uncompressed state to the compressed state.

13. The stator assembly of claim 10, wherein each of the tabs includes a plurality of teeth configured to deform the axial wall during compression from the uncompressed state to the compressed state.

14. The stator assembly of claim 1, wherein at least some of the tabs include a plurality of teeth configured to deform the axial wall.

15. The stator assembly of claim 1, wherein the plurality of tabs are configured to expand radially outwardly when the washer is compressed against the radial wall.

16. A torque converter, comprising:
a front cover arranged to receive a torque;
an impeller having an impeller shell non-rotatably connected to the cover;
a turbine in fluid communication with the impeller and including a turbine shell; and
a stator assembly disposed axially between the impeller shell and the turbine shell, the stator assembly including:
a body rotatable about an axis and having a cavity defined by an axial wall radially spaced from the axis and a radial wall extending radially inward from the axial wall; and
a washer disposed in the cavity and configured to be compressed against the radial wall, the washer including:
a base; and
a plurality of tabs circumferentially spaced from each other and extending radially outward from the base, the plurality of tabs being configured to non-rotatably connect to the axial wall.

17. The torque converter of claim 16, wherein the plurality of tabs are configured to expand radially outwardly when the washer is compressed against the radial wall.

18. The torque converter of claim 16, wherein, in an uncompressed state, the plurality of tabs extend obliquely relative to the axis.

19. The torque converter of claim 16, wherein at least some of the tabs include a plurality of teeth configured to deform the axial wall.

20. The torque converter of claim 16, wherein each tab includes an end spaced from the base, and wherein, in an uncompressed state, the plurality of tabs are radially inside of the axial wall, and, in a compressed state, the ends are radially outside of the axial wall.

\* \* \* \* \*